(No Model.) 2 Sheets—Sheet 1.
A. E. RHOADES.
MECHANICAL MOVEMENT.
No. 470,599. Patented Mar. 8, 1892.
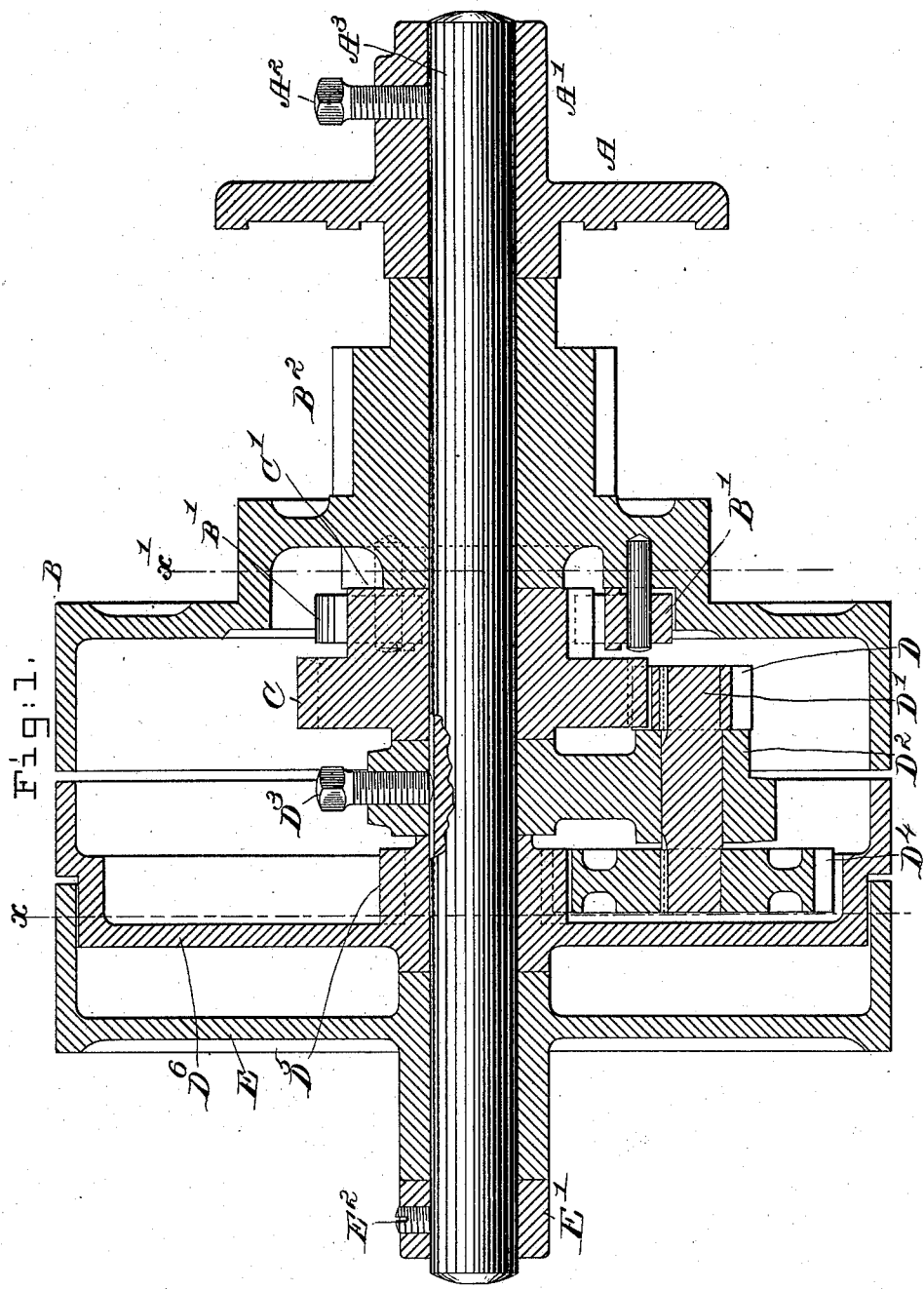
Witnesses:
Fred S. Greenleaf
Louis N. Gowell
Inventor
Alonzo E. Rhoades
by Crosby & Gregory
Attys.

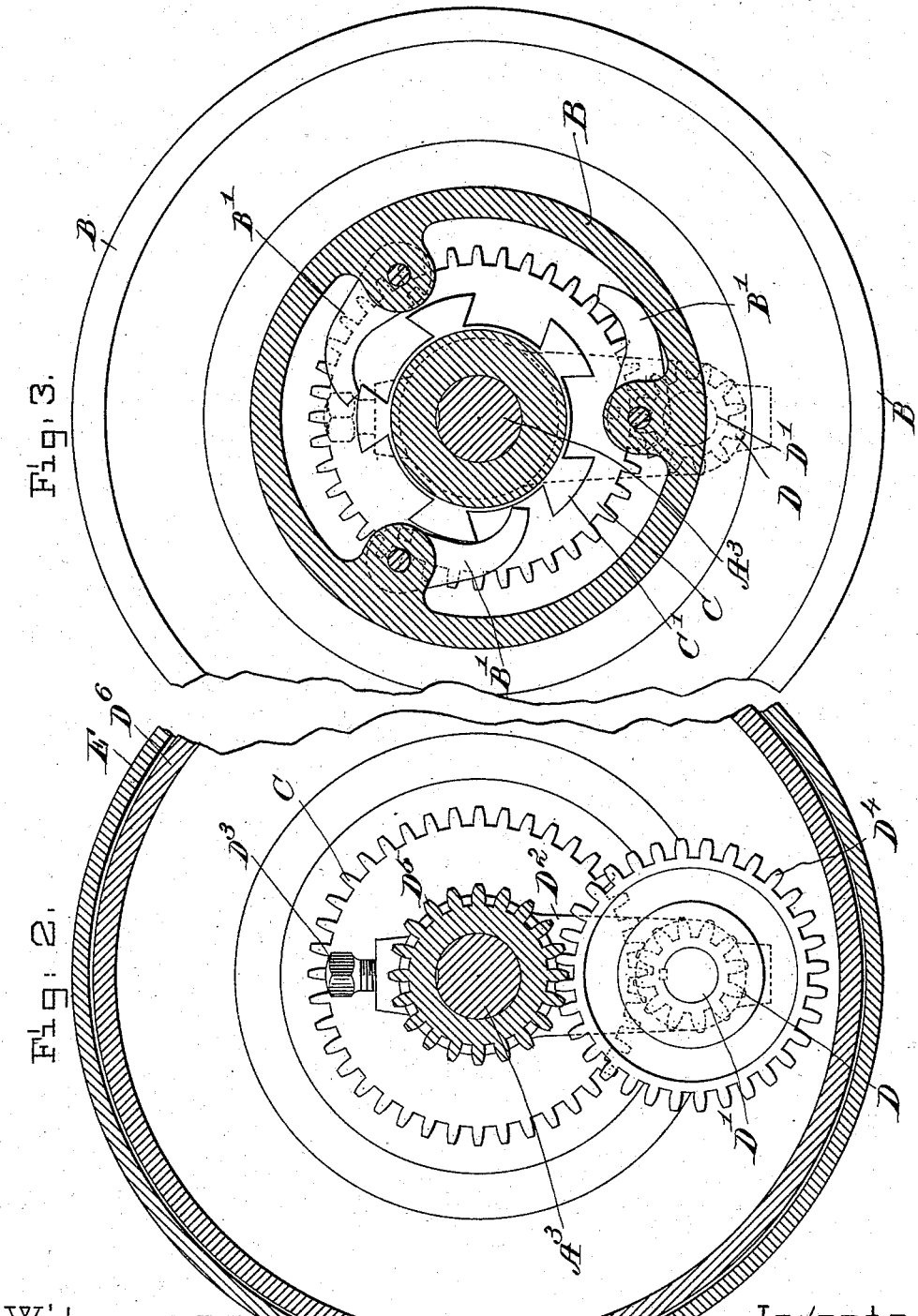

UNITED STATES PATENT OFFICE.

ALONZO E. RHOADES, OF HOPEDALE, MASSACHUSETTS, ASSIGNOR TO THE HOPEDALE MACHINE COMPANY, OF SAME PLACE.

MECHANICAL MOVEMENT.

SPECIFICATION forming part of Letters Patent No. 470,599, dated March 8, 1892.

Application filed November 27, 1891. Serial No. 413,203. (No model.)

*To all whom it may concern:*

Be it known that I, ALONZO E. RHOADES, of Hopedale, county of Worcester, State of Massachusetts, have invented an Improvement in Mechanical Movements, of which the following description, in connection with the accompanying drawings, is a specification, like letters on the drawings representing like parts.

In many classes of machines it is desired frequently to rotate a shaft at different speeds—as, for instance, to start up the machine at slow speed and then to increase the speed. This plan reduces the strains on the machine and insures its better action with less strain on the parts.

My machine is useful in warping or spooling machines and in many other machines.

Figure 1 is a longitudinal section taken through a mechanical movement embodying my invention. Fig. 2 is a section in the line $x$, and Fig. 3 a section in the line $x'$.

Referring to the drawings, A may be considered as a casting adapted to be secured in some suitable manner to the frame of the machine having the shaft to be driven. This casting has a suitable hub A', in which is a set-screw to attach to the casting a short stationary stud $A^3$. This stud has loose on it a fast-speed pulley or wheel B, made shell-like and provided internally with a series of pawls or dogs B', and a toothed driving-gear $B^2$ to engage and rotate a gear on the shaft to be driven. Loose on the stud $A^3$, next the fast-speed pulley B, is an intermediate gear C, having a ratchet-wheel C', which is engaged by the pawls B'. The gear C engages a pinion D on a short shaft D', having its bearing in an arm $D^2$, fast on the stud $A^3$ by a set-screw $D^3$, the opposite end of the said shaft D' having a gear $D^4$. The gear $D^4$ engages a pinion $D^5$, fast on the hub of the slow-speed pulley $D^6$, also loose on the stud $A^3$. Loose on the stud $A^3$, at one side of the slow-speed pulley, is a loose pulley E, kept on the stud, as shown, by a set-screw $E^2$ in a collar E'.

In operation when the belt (not shown) is on the pulley B the gear $B^2$ is driven at its fastest speed. When the belt is put on the slow-speed pulley, the latter is rotated and by its pinion $D^5$, gear $D^4$, shaft D', and pinion D engages and rotates the gear C, and its ratchet-wheel, engaging the pawls B', rotates the fast-speed pulley. When the driving-belt is on the loose pulley E, both the pulleys $D^6$ and B remain at rest.

Having described my invention, what I claim as novel, and desire to secure by Letters Patent, is—

The herein-described mechanical movement for varying speed, it consisting of a stud, a loose pulley E, a slow-speed pulley $D^6$, having a pinion $D^5$, a gear $D^4$, shaft D', pinion D, gear C, ratchet C', and fast-speed pulley having a gear and pawls, all the said pulleys being loosely mounted to rotate about a center common to all, substantially as described.

In testimony whereof I have signed my name to this specification in the presence of two subscribing witnesses.

ALONZO E. RHOADES.

Witnesses:
   E. T. ROSS,
   S. FRED SMITH.